United States Patent
Matyas, Jr. et al.

(10) Patent No.: US 6,940,976 B1
(45) Date of Patent: Sep. 6, 2005

(54) GENERATING USER-DEPENDENT RSA KEYS

(75) Inventors: Stephen Michael Matyas, Jr., Manassas, VA (US); Mohammad Peyravian, Cary, NC (US); Allen Leonid Roginsky, Durham, NC (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/324,308

(22) Filed: Jun. 2, 1999

(51) Int. Cl.$^7$ ................................................ H04L 9/00
(52) U.S. Cl. ........................ 380/44; 380/280; 713/180
(58) Field of Search .......................... 380/44, 280, 277; 713/180

(56) References Cited

U.S. PATENT DOCUMENTS

| | | | | |
|---|---|---|---|---|
| 4,878,246 A | * | 10/1989 | Pastor et al. | 380/44 |
| 4,944,007 A | * | 7/1990 | Austin | 713/180 |
| 5,199,070 A | | 3/1993 | Matsuzaki et al. | 380/30 |
| 5,319,705 A | | 6/1994 | Halter et al. | 705/54 |
| 5,541,994 A | | 7/1996 | Tomko et al. | 380/30 |
| 5,680,460 A | * | 10/1997 | Tomko et al. | 713/186 |
| 5,709,114 A | * | 1/1998 | Dawson et al. | 70/278.2 |
| 6,035,398 A | | 3/2000 | Bjorn | 713/186 |
| 6,065,117 A | | 5/2000 | White | 713/159 |
| 6,215,874 B1 | | 4/2001 | Borza et al. | 380/46 |
| 6,219,794 B1 | | 4/2001 | Soutar et al. | 713/202 |
| 6,226,383 B1 | * | 5/2001 | Jablon | 380/30 |
| 6,307,938 B1 | | 10/2001 | Matyas, Jr. et al. | 380/44 |
| 6,687,375 B1 | | 2/2004 | Matyas, Jr. et al. | 380/45 |

OTHER PUBLICATIONS

Rivest et al. "A Method for Obtaining Digital Signatures and Public Key Cryptosystems," *Communications of the ACM*. vol. 21, No. 2, Feb. 1978, pp. 120–126.

Kim, Hyun–Jung, *Biometrics, Is it a Viable Proposition for Identity Authentication and Access Control?, Computers & Security*, vol. 14, pp. 205–214 (1995).

George, M.H., et al., *A Robust Speaker Verification Biometric, Proceedings the IEEE 29$^{th}$ International Carnahan Conference on Security Technology*, pp. 41–46 (Oct. 1995).

Davida, George I., *On Enabling Secure Applications Through Off–line Biometric Identification, Proceedings of the IEEE Computer Society Symposium on Research in Security and Privacy*, pp. 148–157 (1998).

Brown, Ann V., et al., *Biometric Encryption: Information Privacy In a Networked World, EDI Forum: The Journal of Electronic Commerce*, vol. 10, No. 3, pp. 37–43 (1997).

Matyas, Mike, et al., *Reversible data mixing procedure for efficient public–key encryption, Computers & Security*, vol. 17, No. 3, pp. 265–272 (1998).

(Continued)

*Primary Examiner*—Gilberto Barron
*Assistant Examiner*—Benjamin E Lanier
(74) *Attorney, Agent, or Firm*—Myers Bigel Sibley & Sajovec, PA

(57) ABSTRACT

Methods, systems and computer program products are provided which generate an RSA cryptographic value by obtaining user specific information about a user and determining a user specific range of values based on the user specific information. The potential range of RSA prime values is divided into at least two subintervals and the user specific range of values mapped onto a first of the at least two subintervals. A first user-dependent RSA prime is then selected from the range of RSA prime values in the first subinterval corresponding to the mapped user specific range of values.

57 Claims, 6 Drawing Sheets

OTHER PUBLICATIONS

*ANSI Standard X9.31–1998Digital Signatures Using Reversible Public Key Cryptography for the Financial Services Industry (rDSA)*, pp. 1–64 (May 1998).

Schneier, Bruce, *Applied Cryptography: Protocols, Algorithms, and Source Code in C*, pp. 442–445, 466–474 (Dec. 1995).

http://www.cs.sandia.gov/~mccurley/healt/node8.html; "Biometric Authentication", (1995).

Press Release, "TrueTouch Demonstrates its Biometric Authentication Application Programmers Interface (BAAPI) at CardTech/SecurTech", Apr., 1998.

Oracle Advanced Networking Option Administrator's Guide, Chapter 8, (1996).

AST–Presenting security using biometrics, www.multimania.com/ast/uk/uk–ID1.htm, Apr. 3, 1999.

Matyas Jr. et al. "A New Procedure for Generating Prime Numbers for the RSA Digital Signature Algorithm," IBM Security ITS, Poughkeepsie, NY 1998.

Menezes, Alfred J., et al., *Security of RSA, Handbook of Applied Cryptography*, Ch. 8.2.2, p. 287.

Peyravian et al. "Generating User–Based Cryptographic Keys and Random Numbers," *Computers & Security*, vol. 18, No. 7, pp. 619–626, 1999.

U.S. Appl. No. 09/357,483, filed Jul. 20, 1999.

* cited by examiner

GENERATING USER-DEPENDENT RSA KEYS

RELATED APPLICATIONS

The present application is related to commonly assigned and concurrently filed U.S. patent application Ser. No. 09/324,418, entitled "METHODS, SYSTEMS AND COMPUTER PROGRAM PRODUCTS FOR GENERATING USER-DEPENDENT CRYPTOGRAPHIC KEYS," the disclosure of which is incorporated herein by reference as if set forth fully.

FIELD OF THE INVENTION

The present invention relates to cryptography and more particularly to the generation of cryptographic key values for RSA asymmetric cryptosystems.

BACKGROUND OF THE INVENTION

Asymmetric (or public) key cryptosystems use two different keys that are not feasibly derivable from one another, one for encryption and another for decryption. A person wishing to receive messages, generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, since only he has the private key. Asymmetric-key cryptosystems may also be used to provide for digital signatures, in which the sender encrypts a signature message using his private key. Because the signature message can only be decrypted with the sender's public key, the recipient can use the sender's public key to confirm that the signature message originated with the sender. One of the best-known asymmetric-key cryptosystems is the RSA, named for its originators Rivest, Shamir and Adleman. One version of RSA is defined by ANSI Standard X9.31-1998.

RSA is widely used in many cryptographic systems. RSA gets its security from the difficulty of factoring large prime numbers. The RSA public and private keys are derived from two randomly selected large prime numbers.

The general way to derive the two RSA keys is as follows. First choose two random large prime numbers p and q. Compute N=p×q, which is referred to as the public modulus. Then randomly choose the public key e such that e and (p−1)×(q−1) are relatively prime. Finally, compute the private key d such that $d=e^{-1} mod((p-1)×(q-1))$. RSA encryption and decryption formulas are straightforward. To encrypt a message m, compute $c=m^e mod N$, where c is the ciphertext. To decrypt c, compute $m=c^d mod N$.

It has been suggested that two users with different moduli might have a common prime factor in their moduli, either by accident or because of a poor design (design flaw) in the system. If $N_1=p_1×q_1$ and $N_2=p_2×q_2$, where (say) $p_1=p_2$, then it is easy to find $p_1$ or $p_2$ given $N_1$ and $N_2$ and, i.e., an efficient algorithm exists to find the common factor $p_1$ or $p_2$ given $N_1$ and $N_2$. If such a common prime factor were to exist, and this fact were discovered, then it would also be an easy matter to factor each modulus into its prime factors. This, of course, would allow the private keys to be computed from the corresponding public keys, and hence for the security of the keys to be compromised.

In general, mechanisms for differentiating between users are known. For example, a particular individual can be identified or verified through a user identifier (such as a globally unique name) or biometric data (such as fingerprint, hand geometry, iris pattern, facial features, voice characteristics, handwriting dynamics, earlobe characteristics, etc.).

As is well known to those having skill in the art, biometric information is one or more behavioral and/or physiological characteristics of an individual. Biometric identification and/or verification uses a data processing system to enable automatic identification and/or verification of identity by computer assessment of a biometric characteristic. In biometric verification, biometric information is verified for a known individual. In biometric identification, biometric information for an individual is compared to known biometric information for many individuals in order to identify the individual.

Biometric identification/verification systems, methods and computer program products can measure one or more of the following behavioral and/or physiological characteristics of an individual: fingerprint, hand geometry, iris pattern, facial features, voice characteristics, handwriting dynamics, earlobe characteristics and keystroke dynamics. Other biometric characteristics may be used. Applications using biometric technologies include biometric check cashing machines, payment systems that substitute biometric data for personal identification numbers, access control systems that use biometric data, biometric employee time and attendance recording and biometric passenger control for transportation. Many other applications may utilize biometric information for identification and/or verification. See the publications entitled "*Biometrics, Is it a Viable Proposition for Identity Authentication and Access Control*", to Kim, Computers & Security, Vol. 14, 1995, pp. 205–214; "*A Robust Speaker Verification Biometric*", to George et al., Proceedings, the IEEE $29^{th}$ International Carnahan Conference on Security Technology, October 1995, pp. 41–46; "*On Enabling Secure Applications Through Off-line Biometric Identification*", to Davida et al., Proceedings of the IEEE Computer Society Symposium on Research in Security and Privacy, 1998, pp. 148–157; and "*Biometric Encryption: Information Privacy in a Networked World*", to Brown et al., EDI Forum: The Journal of Electronic Commerce, v. 10, No. 3, 1997, pp. 37–43. However, while biometric identification and user identification may allow for identification of users, these existing uses may not allow for authentication of the source of encryption keys.

In the above cited Davida et al. publication, in Section 5.2, it was proposed that biometrics could be used with or as keys. However, Davida et al. assumes that the biometric information is secret information. Furthermore, Davida et al. may not work for any size key and describes a procedure which may not allow for pre-computing information for generation of a key value. Furthermore, the proposal of Davida et al. may allow two users to generate the same key values and, thus, does not assure that the generated keys are disjoint.

In light of the above discussion, a need exists for improvements in the generation of encryption keys for RSA cryptosystems.

SUMMARY OF THE INVENTION

In view of the above discussion, it is an object of the present invention to provide cryptographic keys which may be authenticated.

A further object of the present invention is to provide for the generation of cryptographic keys which may be audited to determine the user which generated the cryptographic keys.

A further object of the present invention is to provide RSA keys which satisfy the requirements of the ANSI Standard X9.31-1998.

Yet another object of the present invention is to provide RSA keys which are-disjoint for different users.

These and other objects of the present invention may be provided by methods, systems and computer program products which generate an RSA cryptographic key by obtaining user specific information about a user and determining a user specific range of values based on the user specific information. The potential range of RSA prime values is divided into at least two subintervals and the user specific range of values mapped onto a first of the at least two subintervals. A first user-dependent RSA prime is then selected from the range of RSA prime values in the first subinterval corresponding to the mapped user specific range of values.

Furthermore, the user specific range of values may also be mapped onto a second of the at least two subintervals where the second subinterval is different from the first subinterval. A second user-dependent RSA prime may then be selected from the range of RSA prime values in the second subinterval corresponding to the mapped user specific range of values.

By mapping a user specific range of values onto the potential range of prime values, the present invention will guarantee a very high probability that different users will select prime values from different ranges. Thus, the range of prime values from which an RSA prime is selected may be used to authenticate and audit the prime after generation. If a prime is not from the user specific range mapped onto the range of potential prime values, then the key value was not from the user corresponding to the user specific information. Such a mapping into at least two different subintervals may also assure that two users will not have the same primes and that the two primes will be from different subintervals of the range of potential prime values.

In a further embodiment, a specific range of values are linearly mapped onto a first of the at least two subintervals. In a still further embodiment of the present invention, the user specific range of values onto the first subinterval and the second subinterval utilizing the same mapping function.

In particular embodiments of the present invention the RSA primes comprise n bits and the at least two subintervals comprises RSA prime values from the set $[\sqrt{2}(2^{n-1}), 2^{n-1}+2^{n-3/2}]$ and the second subinterval comprises RSA prime values from the set $[2^{n-1}+2^{n-3/2}, 2^n]$. Furthermore, the difference between the first RSA prime and the second RSA prime is greater than $2^{n-2}$.

In yet another embodiment of the present invention, the first subinterval is an interval [a,b], the user specific range is an interval [c,d] and the linear mapping function is the function defined by, $$F(x) = ux + v, \text{ where } u = \frac{d-c}{b-a} \text{ and } v = \frac{bc - ad}{b-a}.$$

In another embodiment of the present invention, a second RSA prime is selected from the potential range of RSA prime values.

In particular embodiments of the present invention, the user specific information is biometric information, a globally unique user identification or a combination of the two.

In another embodiment of the present invention, the first user-dependent RSA prime is selected by selecting a random point in the range of RSA prime values in the first of the at least two subintervals corresponding to the mapped user specific range of values and then utilizing the random point as a starting point for a search for a prime number (p) in the range of RSA prime values in the first of the at least two subintervals corresponding to the mapped user specific range of values. Furthermore, it may be determined if a candidate for p is considered outside the range of RSA prime values in the first of the at least two subintervals corresponding to the mapped user specific range of values. A new random point is then selected as a search starting point if a candidate for p is considered outside the range of RSA prime values in the first of the at least two subintervals corresponding to the mapped user specific range of values. The search for p would then be restarted utilizing the new random point.

In yet another embodiment of the present invention, a cryptographic value corresponding to a source entity is generated by obtaining entity specific information associated with the source entity. The cryptographic value is then selected from a range of cryptographic values based on the entity specific information, where the range of cryptographic values based on the entity specific information is disjoint with ranges of cryptographic values associated with entity specific information associated with entities other than the source entity. In particular embodiments, the entity specific information may be biometric information, a globally unique user identification or a company identification.

In a further embodiment, where the cryptographic value comprises an RSA prime, the selection of the RSA prime may be accomplished by selecting the RSA prime from a portion of the range of potential RSA prime values based on the entity specific information. The portion of the range of potential RSA prime values is defined by mapping an entity specific range of values oaf onto the range of potential prime values.

In a still further embodiment of the present invention, the source entity of the cryptographic value may be authenticated by determining if the cryptographic value is within the range of cryptographic values based on the entity specific information associated with the source entity.

Thus, the present invention may provide for "branding" a cryptographic value so that the cryptographic value may be authenticated by determining if the value corresponds to a unique range of values associating with an entity through the use of entity specific information, such as a company identification or such a the user specific information of biometric or user identification information.

As will further be appreciated by those of skill in the art, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or a computer program products for generating a user-dependent RSA cryptographic primes and keys which are unique. As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
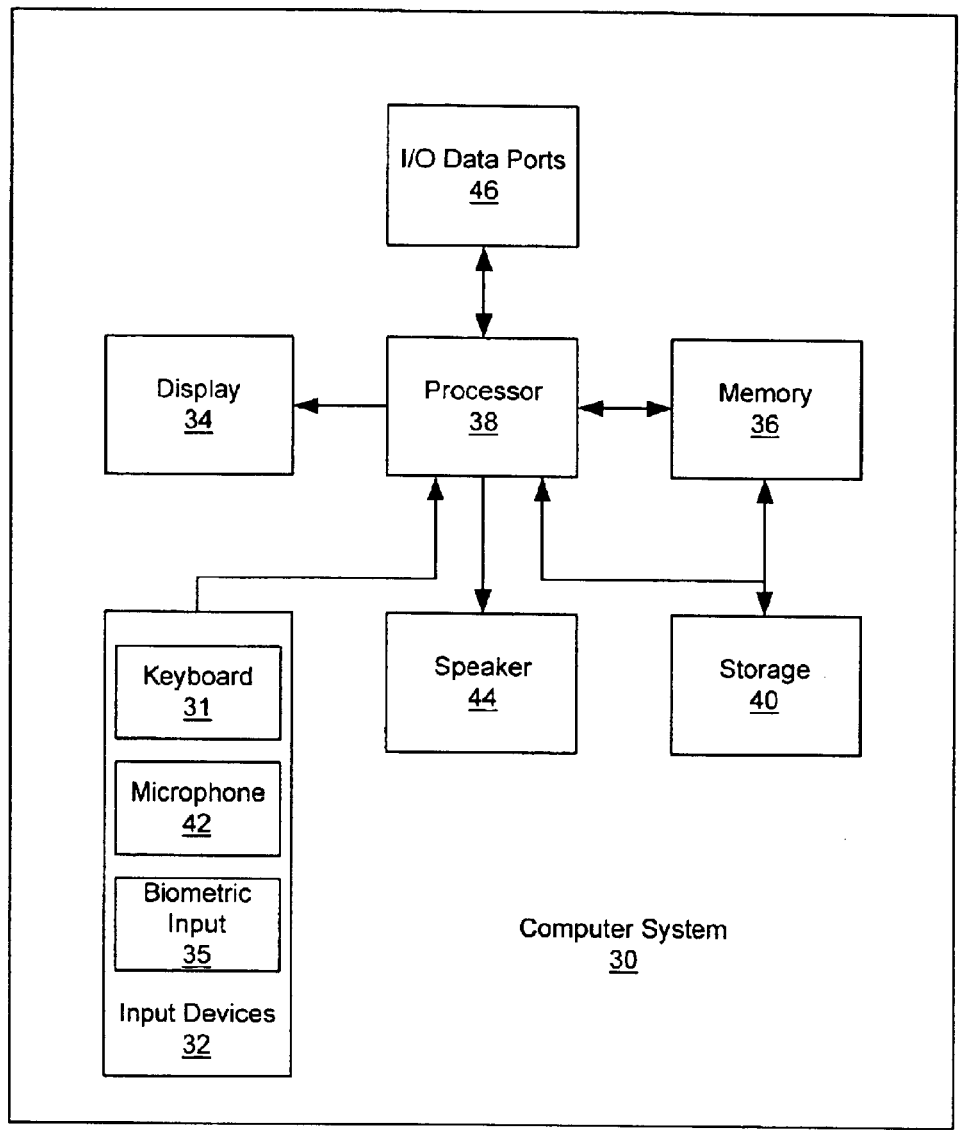
FIG. 1 is diagram of a data processing system suitable for use with the present invention.

Referring now to FIG. 1, an exemplary embodiment of a computer system 30 in accordance with the present invention typically includes input devices 32, such as a keyboard or keypad 31, a microphone 42 and/or preferably, a biometric information input device 35. The computer system 30 also preferably includes a display 34 and a memory 36 that communicate with a processor 38. The computer system 30 may further include a speaker 44 and an I/O data port(s) 46 that also communicate with the processor 38. The I/O data ports 46 can be used to transfer information between the computer system 30 and another computer system or a network (e.g., the Internet). FIG. 1 also illustrates that computer system 30 may include a storage device 40 which communicates with memory 36 and processor 38. Such a storage device may be any type of data storage device as described above. These components are included in many conventional computer systems (e.g., desktop, laptop, or handheld computers) and their functionality is generally known to those skilled in the art.

Furthermore, while the present invention is described with respect to the computer system 30, as will be appreciated by those of skill in the art, the present invention may be incorporated into many other devices where RSA cryptographic primes and/or keys are generated and, thus, may comprise an embedded function in many other devices. Thus, the present invention should not be construed as limited to use in computer systems such as illustrated in FIG. 1 but may be incorporated in any device having sufficient processing capabilities to carry out the operations described below.

Figure 2:
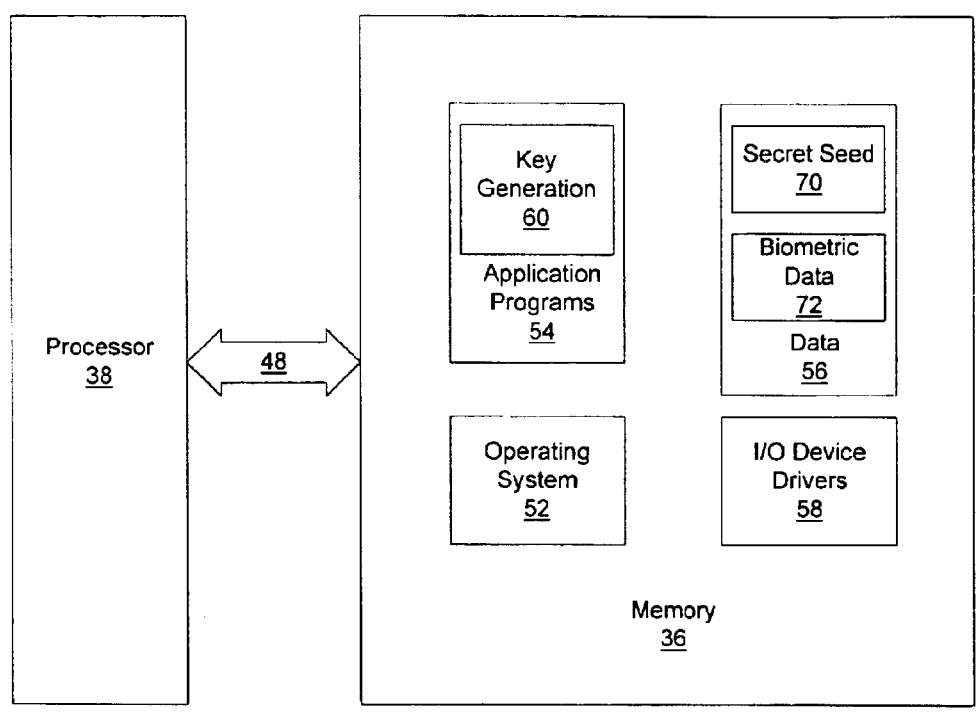
FIG. 2 is a detailed view of a data processing system suitable for use with the present invention.

FIG. 2 is a more detailed block diagram of the computer system 30 that illustrates one application of the teachings of the present invention. The processor 38 communicates with the memory 36 via an address/data bus 48. The processor 38 can be any commercially available or custom microprocessor or other processing system capable of carrying out the operations of the present invention. The memory 36 is representative of the overall hierarchy of memory devices containing the software and data used to implement the functionality of the computer system 30. The memory 36 can include, but is not limited to, the following types of devices: cache, ROM, PROM, EPROM, EEPROM, flash, SRAM, and DRAM.

As shown in FIG. 2, the memory 36 may hold four major categories of software and data used in the computer system 30: the operating system 52; the application programs 54; the input/output (I/O) device drivers 58; and the data 56. The I/O device drivers 58 typically include software routines accessed through the operating system 52 by the application programs 54 to communicate with devices such as the input devices 32, the display 34, the speaker 44, the microphone 42, the I/O data port(s) 46, and certain memory 36 components. The application programs 54 comprise the programs that implement the various features of the computer system 30 and preferably include at least one application module or object for RSA key generation 60 which carries out the operations of the present invention as described below. Finally, the data 56 represents the static and dynamic data used by the application programs 54, operating system 52, I/O device drivers 58, and any other software program that may reside in the memory 36. As illustrated in FIG. 2, the data 56 preferably includes a secret seed value 70 and biometric or other user specific data 72. Additional intermediate data (not shown) may also be stored in memory. Furthermore, while the present invention is described as an application executing on computer system 30, as will be appreciated by those of skill in the art, the present invention may be implemented in any number of manners, including incorporation in operating system 52 or in an I/O device driver 58.

Figure 3:
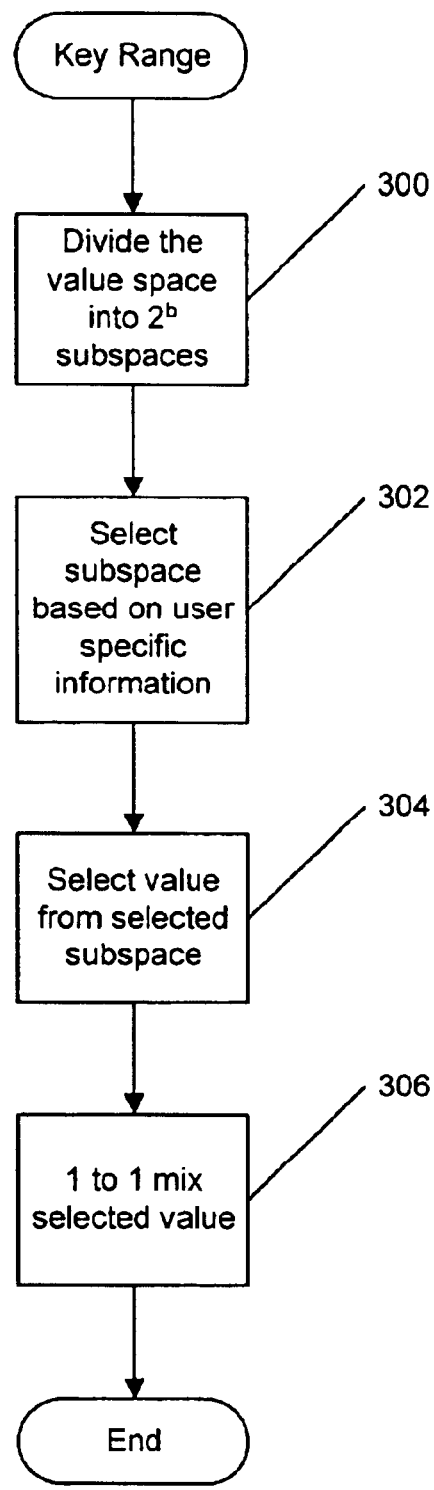
FIG. 3 is a flowchart illustrating operations according to a fourth alternative embodiment of the present invention.
Figure 4:
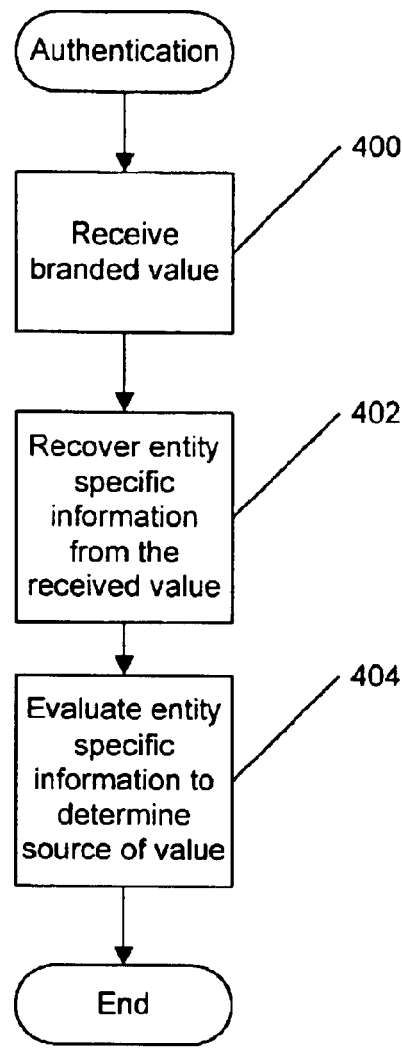
FIG. 4 is a flowchart illustrating authentication/auditing of a branded value according to one embodiment of the present invention.
Figure 6:
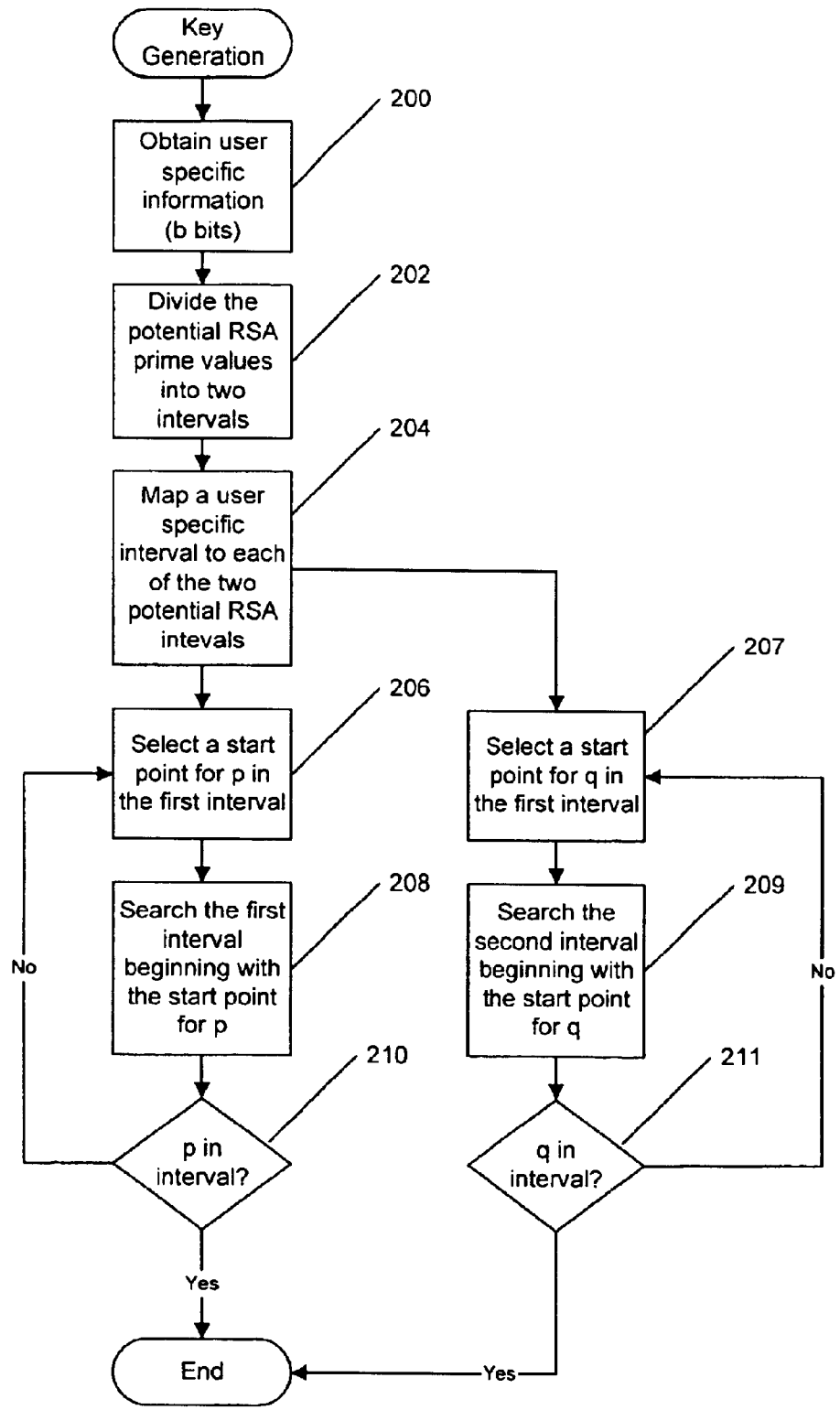
FIG. 6 is a flowchart illustrating operations according to one embodiment of the present invention.

The present invention will now be described with respect to FIGS. 3, 4 and FIG. 6. FIGS. 3, 4 and 6 are flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustration, can be implemented by special purpose hardware-based systems which perform the specified functions or steps, or combinations of special purpose hardware and computer instructions.

The present invention provides for generating RSA cryptographic primes and/or keys using user specific information such as users' user identification (userID) data as well as users' biometric data. While userID data and biometric data are fundamentally different, the two data types have characteristics in common which may be exploited in providing user-dependent cryptographic primes and/or keys. For example, some of the differences in userID and biometric data can be identified as follows:

1) A userID is assigned to a user, whereas biometric data is obtained or derived from the user. Generally speaking, a user's userID is an independent variable, whereas a user's biometric data is a dependent variable.
2) A user's userID can be changed. A user's biometric data cannot be changed. At most, a user can attempt to switch from one biometric to another biometric (e.g., fingerprint to hand geometry).
3) Generally, the set or space of user identifiers may be dense, making it feasible to enumerate the set of user identifiers. Generally, the space of user biometric data is not dense, making it infeasible to enumerate the biometric data for each user.
4) Biometric data can be used to authenticate a user while userID data cannot be used to authenticate a user.
5) A userID is a constant. User biometric data is not constant.

However, the similarities in userID and biometric data which may be utilized to provide user-dependent cryptographic keys can be identified as follows:

1) A userID is different for each user and biometric data is generally different for each user. Note that, in some cases, it may happen that the biometric data for one user overlaps (in whole or in part) with another user. The degree to which this may occur can depend on a combination of the biometric method being employed and the sensitivity of the biometric reader devices being employed.
2) A userID data is non-secret data. Biometric data should be considered as non-secret data, although in some vendor proprietary systems user biometric data is encrypted (i.e., protected). Since there is no practical way to prevent the capture of user biometric data outside the biometric system, it is false to assume that the secrecy of user biometric data can be maintained over time.
3) Biometric data, like userID data, can be used to identify users. In fact, in some sense, biometric data offers a better mechanism for user identification, since biometric data provides a mechanism of positive identification, whereas userID data, until verified via a separate authentication protocol, is only representative of a claimed identity.

One potential advantage to using biometric data as the user specific information is that with biometric data, there is potentially an easy mechanism for the user to prove their identity, especially if the user carries their biometric certificate on a portable token (e.g., smart card). With a userID, the presumed or claimed identity of the user is known, however, the user to whom the key or cryptographic variable belongs will not necessarily have an easy means to prove that they are that user. A user will not always carry sufficient credentials to prove their identity (e.g., birth certificate or passport).

FIG. 3 illustrates an embodiment of the present invention which guarantees that two different users will generate different cryptographic values. As seen in FIG. 3, the space of all potential cryptographic values (i.e. $2^n$ for an n-bit cryptographic value) is divided into $2^b$ subspaces where b is the number of bits of user specific information and where n>b (block 300). Note that each of the $2^b$ subspaces contain cryptographic values having n bits. One of the subspaces is then selected based on the user specific information of a particular user (block 302). The user-dependent cryptographic value is then selected from the subspace selected by the user specific information (block 304). Optionally, the selected value may be further mixed (block 306) utilizing a mixing function, such as a 1 to 1 mixing function described in Matyas, M., Peyravian, M., Roginsky, A., and Zunic, N., "Reversible data mixing procedure for efficient public-key encryption," Computers & Security Vol. 17, No. 3, (265–272) 1998, which can be applied to any arbitrary n-bit input.

As an example, a way to divide an n-bit space into $2^b$ sub-spaces is to take the first b bits from the user specific information and allow the remaining n–b bits to take any value (e.g. concatenating a random value of n–b bits with the b bits of the user specific information). The b-bit user specific data may include a t-bit field which indicates the type of biometric data (e.g., fingerprint, hand geometry, iris pattern, facial features, etc.).

If the operations illustrated in FIG. 3 are terminated at block 304, the generated value is, in general, highly structured. In this case, the generated n-bit cryptographic value consists of a user-specific portion of b bits (e.g., biometric data) and a random secret portion of n–b bits. If the user-specific portion is a userID, then the user-specific portion would be a non-secret constant value for each user. If the user-specific portion is biometric data, then the user-specific portion might still be non-secret and contain structure or redundancy. In either case, it could be undesirable for a cryptographic value to contain so much predictability in some particular portion of it which might give an attacker some advantage. Thus, it may be advantageous to employ a mixing function to mix the user-dependent value so that the secret entropy in it will be uniformly spread over the entire key or random number.

As illustrated in optional block 306 of FIG. 3, the n-bit key or random value produced is subjected to a further mixing operation. The n-bit key or random value, produced using the above scheme, is mixed using a 1-to-1 mixing function to produce the final value. One such suitable 1-to-1 mixing function is the reversible data mixing function described above which can be applied to any arbitrary n-bit input.

The specification of the b bits of user-specific information can be further explained, and amplified on. In certain cases, the values of n and b will be u specified or fixed. In that case, the length of the user-specific information L may be less than b (L<b), equal to b (L=b), or greater than b (L>b). If L=b, then the entire user-specific information is used as the desired b bits. If L<b, then the desired b bits ill can be obtained as a function of the user-specific information, e.g., by tiling the user-specific information and selecting the first b bits from the tiled user-specific information. If L>b, then b bits can be obtained as a function of the user-specific information, e.g., by hashing the user-specific information by selecting b specific bits of Z where Z=H(B)∥H(B+1)∥H (B+2)∥ . . . ∥H(B+a), where a is the largest number smaller than h/b, where h is the number of bits resulting from the hash function H and where ∥ represents a concatenation operation.

While the present invention does not guarantee that the same user will not accidentally generate the same primes as RSA key values, if the user saves all prior moduli, it could be readily determined if the newly generated primes are factors of any previously generated moduli. Such testing would be up to the user, and totally under the user's control, both to save prior moduli and test these moduli. The really difficult and insurmountable problem would be to test one user's primes against the moduli for all other users. The present invention obviates the need for such testing.

Another benefit of the utilization of the present invention, is that by making the cryptographic value generation process dependent on user-specific data, such as a userID or biometric data, one has the ability to later prove that a generated value belongs to a particular user. In this regard, the present invention provides a means to "brand" a value so that its rightful user can be determined. This branding feature may ensure that a user can prove that a cryptographic value is one belonging to, or generated in, his designated space of values and that a user cannot deny that a value is one belonging to, or generated in, his designated space of values.

FIG. 4 illustrates operations according to a further embodiment of the present invention which utilizes the branded value to authenticate the source of the value. As seen in FIG. 4, the branded value is received (block 400) and entity specific information (such as the user specific information described above) is recovered from the received branded value. The branded value is preferably a value which has been generated in a manner described above according to the various embodiments of the present invention utilizing the user specific information to provide the branded value. After recovering the entity specific information, this information is then utilized to determine the source of the branded value (block 404). Preferably, the recovery and evaluation are performed by determining if the received value is a value from the subspace of the source. If such is the case, then the source of the branded value is authenticated.

Utilizing the above characteristics of userIDs and biometric data, the present invention may provide for the generation of RSA cryptographic primes and keys as described in FIG. 6. FIG. 6 will be described with reference to FIG. 5 which is an illustration of the mapping operations of the present invention to provide user-dependent RSA primes from the interval of potential primes for an n bit prime. As seen in FIG. 6, the present invention provides for generating user-dependent RSA primes which are unique by obtaining user specific information of b bits (block 200). The interval of potential RSA prime values is then divided into two intervals (block 202)(illustrated in FIG. 5 as $I_1$ and $I_2$). An interval based on the user specific information ($d_U$ of FIG. 5) is then mapped to each of the two intervals $I_1$ and $I_2$, preferably with a linear mapping function to provide $h_{U1}$ and $h_{U2}$, which are the images of $d_U$ in the intervals $I_1$ and $I_2$ (block 204).

After mapping the user specific interval to the two intervals, each interval is utilized to provide one of the two primes used in RSA (p and q). Thus, the flowchart of FIG. 6 provides two paths from block 204 which may be executed concurrently or sequentially. A first path from block 204 selects a start point $sp_1$ for a search for the p RSA prime in the interval $h_{U1}$ (block 206). A search is then performed from the start point $sp_1$ in the interval $h_{U1}$ to determine the p RSA prime (block 208). When a candidate for the p RSA prime is found it is determined if the candidate falls within the $h_{U1}$ interval (block 210). If not, then a new start point is selected at random from the $h_{U1}$ interval and the search process begins again. If the candidate p RSA prime is within the interval $h_{U1}$, then the candidate is used as the RSA prime p.

A second path from block 204 selects a start point $sp_2$ for a search for the q RSA prime in the interval $h_{U2}$ (block 207). A search is then performed from the start point $sp_2$ in the interval $h_{U2}$ to determine the q RSA prime (block 209). When a candidate for the q RSA prime is found it is determined if the candidate falls within the $h_{U2}$ interval (block 211). If not, then a new start point is selected at random from the $h_{U2}$ interval and the search process begins again. If the candidate q RSA prime is within the interval $h_{U2}$, then the candidate is used as the RSA prime q.

Thus, the present invention can provide RSA primes which are based on user specific information. These primes may then be further used to generate user-dependent RSA key values as described above. Furthermore, because the intervals $d_U$ for users are disjoint, the resulting RSA primes will also be disjoint. By making the prime generation process dependent on user-specific data, such as a userID or biometric data, one has the ability to later prove that a generated prime and/or key belongs to a particular user. In this regard, the present invention can provide a means to "brand" a key or prime so that its rightful user can be determined. This branding feature may ensure that a user can prove that a key or prime is one belonging to, or generated in, their designated space of keys or primes and that a user cannot deny that a key or prime is one belonging to, or generated in, their designated space of keys or primes.

In a public key cryptosystem, consider the case where an adversary steals another user's private key, and then takes the public key and requests and receives a certificate for that public key from a certification authority (CA). In this case, the certificate binds the public key to the adversary's userID. The adversary then signs with the stolen private key. Later the adversary, repudiates their signatures by claiming that the other party stole their private key. However, the branding of the present invention can defend against the described attack. If a dispute arises, the branded key will indicate which user is the authorized user.

In case of a dispute, the user-specific information in the branded key, prime or other cryptographic value is used to determine the identity of the user to whom the value belongs. If the user-specific data is a userID, then the identity of the user is automatically known. If the user-specific data is biometric data, then the biometric data may be used to establish the identity of the user, using a biometric identification process. The process of biometric identification consists of comparing the given biometric data against a set of biometric templates, e.g., a set of biometric templates stored in a central data base. We assume that for each such biometric template there is an associated userID identifying the user to which the template pertains. If a "match" is found, then the identity of the user has been determined.

However, if it were the case that the presumed identity of the user is given, then a biometric verification procedure could be used instead. If the biometric data stored in the key or cryptographic variable were a biometric template, then the user could be asked to provide a biometric sample, thus enabling the user to authenticated against the given biometric template. If the biometric data stored in the key, prime or other cryptographic value were instead a biometric sample, then the biometric sample would have to be authenticated against a biometric template (for that user), e.g., a biometric template stored in a central data base or a biometric template contained in a trustworthy biometric certificate that itself could be validated.

The present invention is particularly well suited for use in RSA prime and key generation which satisfies the ANSI standard. According to ANSI standard X9.31-1998, the generation of an RSA key begins by generating a random number in an appropriate interval. This number, in turn, serves as a starting point for a search for a prime number which then becomes a part of the secret key. Hence it is not sufficient to guarantee that every user gets a different starting point in this process. It is the chosen primes that should ultimately be different.

While sharing one prime between two different users does not immediately lead to a breakdown of an RSA encryption or signature generation, it may lead to various attacks if the fact that the primes are shared gets discovered. The identical primes can be generated accidentally or can be deliberately set equal by an attacker whose job is to generate the keys for the RSA algorithm. It is difficult to guard against such an attack, because the public keys $N_1=pq_1$ and $N_2=pq_2$ are different and it is not known how to check if one of the primes, p, is the same without examining every pair of public keys.

Second, some primes are more secure than others and, therefore, it is important to make sure that they are not only unique, but also not deliberately chosen to be weak by a user, even within user-specific data constraints. Such choice of primes would constitute what is known as "the first party attack."

The present invention can satisfy all of the requirements of RSA key generation outlined in the ANSI standard and, in addition, can guarantee that all of the primes generated by different users are unique and are ultimately tied to user-specific data which may provide audit and authentication capabilities.

In the description of the ANSI compliant embodiment of the present invention, the user-specific data (i.e., userID or biometric data), denoted by B, is uniquely expressed by b bits. When the user-specific data is biometric information, either the "biometric sample" taken in real-time or the pre-computed reference "biometric template" of a user may be utilized. In either case it is assumed that the biometric data is constant. Biometric data need not be secret. It is further preferred that the b bits allows for expressing any fuzziness included in the biometric data, if biometrics are used as the user-specific data.

As described above, the objective is to generate two random n-bit long (where n>b) prime numbers p and q, using the user-specific data B. As is further described above, this may be accomplished by first dividing the n-bit long random number space into $2^b$ sub-spaces. Each sub-space is assigned to a particular A user based on their b-bit unique user-specific data. Then, n-bit long random numbers from the user's sub-space.

The user's sub-space is mapped to two intervals of the potential key values utilizing, preferably, a linear function. Thus, throughout this section the present invention will be described with reference to a linear function F(a,b,c,d;x) that maps an interval [a,b] into an interval [c,d]. When it is clear from the context what parameters are used the x and also the a, b, c and d may be omitted from the formula for F. F can be defined explicitly as $$F(x) = ux + v, \text{ where } u = \frac{d-c}{b-a} \text{ and } v = \frac{bc-ad}{b-a}.$$

Figure 5:
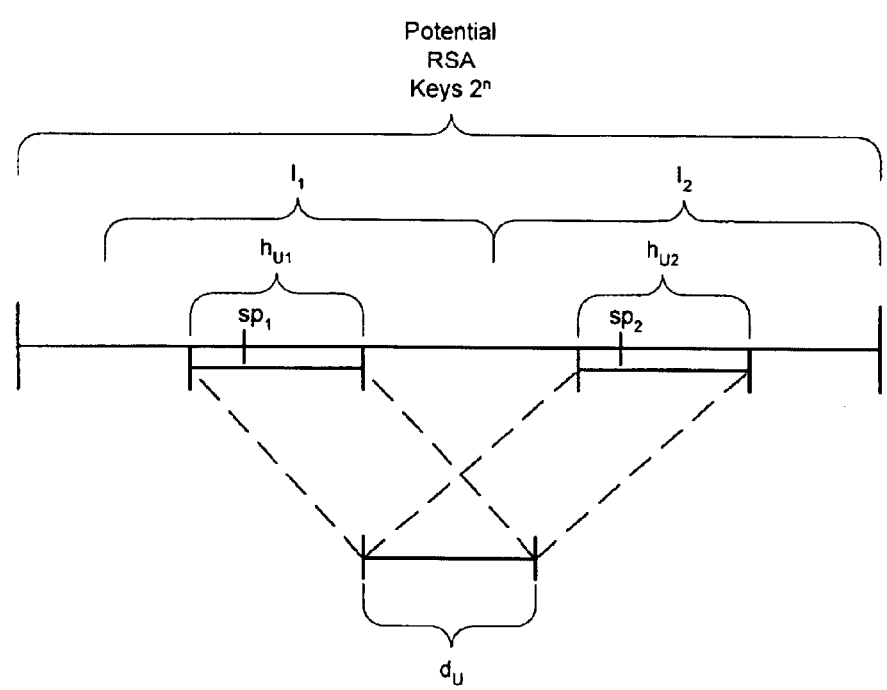
FIG. 5 is diagram illustrating the division of the key space and the assignment of user specific subspaces for an RSA encryption technique according to the present invention.

In order to generate a prime pair (p, q) for a particular user U with user-specific data B, we first allocate the following interval of $2^{n-b-1}$ numbers for U. These will be all numbers whose binary representations contain n bits, with the first bit set to 1, followed by b bits of U's user-specific data B. The remaining n−b−1 bits can take any values. This interval therefore contains $2^{n-b-1}$ consecutive integers and all of these numbers are greater than or equal to $2^{n-1}$ and smaller than $2^n$. The intervals are all distinct, since no two users share the same user-specific data B. An interval created using U's user-specific data will be denoted $d_U$ and is illustrated in FIG. 5, and the entire interval $[2^{n-1}, 2^n]$ will be called D.

While, U's primes p and q could be selected from this interval, there are, however, two requirements of the ANSI standard that may not allow this. First, both p and q must be greater than $\sqrt{2}(2^{n-1})$. This is required so that the RSA public key N=pq has exactly 2n bits. Second, the difference between p and q must be large, which might not be possible (depending on the value of n−b) if they were both selected from the same interval.

Therefore, the interval $I=[\sqrt{2}(2^{n-1}), 2^n]$ divided into two intervals of equal lengths:

$I_1=[\sqrt{2}(2^{n-1}), 2^{n-1}+2^{n-3/2}]$ and $I_2[2^{n-1}+2^{n-3/2}, 2^n]$

Then the interval D is mapped onto $I_1$ using the linear function F defined above with parameters a, b, c and d representing the end points of the corresponding intervals. As is seen in FIG. 5, $h_{U_x}$ represents the corresponding image of interval $d_U$ mapped to interval $I_x$. The points of both intervals can be viewed as real numbers. All of the $h_{U_1}$ subintervals of $I_1$ are disjoint. The length of each of these subintervals is $$\frac{length(d_u) \times length(I_1)}{length(D)} = 2^{n-b-1}\left(1 - \frac{1}{\sqrt{2}}\right),$$

which is approximately 0.293 of the lengths of the original intervals $d_U$.

Next, as is described in FIG. 6 at block 206, a random point $sp_1$ is selected in $h_{U_1}$. The selection may be performed by any mechanism that allows for passing an audit where the randomness of this selection could be demonstrated. This mechanism could be a properly adopted scheme from the ANSI standard or any other agreed-upon procedure. Then a prime number p is generated precisely as described in ANSI Standard X9.31-1998, with $sp_1$ being the starting point for a search of p. As is described in blocks 208 and 210 of FIG. 6, if the search for p continues until a candidate is considered outside $h_{U_1}$, the search stops and a new starting point $sp_1$ must be selected randomly.

As described above with reference to FIG. 6, the prime q may be generated exactly like p, except that the interval D is mapped onto the interval $I_2$ rather than onto $I_1$. This procedure guarantees that q−p is larger than the difference between the length of $I_1$ and the length of $h_U$. It may be demonstrated that this difference is greater than $2^{n-2}$ for every b≧1, so the requirement of the ANSI Standard X9.31-1998 for p and q to be sufficiently far apart is easily satisfied. The user then can publish its public key N=pq (along with a public exponent e).

It may also be shown that the intervals $h_U$ are large enough for a search for a prime number to be successful under reasonable assumptions on n and b. A first assumption is that $n \geq 512$, i.e., the prime numbers p and q are at least 512 bits long (the shortest value of n permitted by ANSI standards). A second assumption is that b is less than or equal to about 200. While this second assumption may not be true for any possible kind of biometric measurements, there are fewer than $2^{33}$ human beings living on Earth and, therefore, while the biometric measurements are expected not to be precise and having 33 bits would not be enough to create a unique template for every living person, 200 bits should be more than sufficient. Under these assumptions, the length of every interval $h_U$ is greater than $0.29 \times 2^{512-200-1} > 2^{309}$.

The point $sp_1$ is chosen uniformly randomly in the interval $h_U$. With probability $1-2^{-20}$ there will be at least $2^{289}$ integers in $h_U$ greater than $sp_1$. As it is specified in ANSI Standard X9.31-1998, the prime number p must have a certain remainder v(mod r), where r is equal to either $p_1 p_2$ or $8 p_1 p_2$, and $p_1$ and $p_2$ are prime numbers that guarantee that the generated prime p is "strong." Each of the primes $p_1$ and $p_2$ has at least 100 but no more than 120 bits in its binary representation, so $r \leq 2^{243}$. Hence with probability $1-2^{-20}$ there will be at least $2^{46}$ integers in $h_{U1}$ greater than $sp_1$ and having the desired remainder v(mod r). The density of primes among them is greater than $1/\ln(2^{n-1})$, so if n=512, then on the average, one out of every 355 consecutive integers in the corresponding numerical sequence will be prime. More than half of these primes will be mutually prime with the RSA public exponent e. This results in a very high probability of finding the desired prime p in the interval $h_U$. In the unlikely event that $sp_1$ is chosen too close to the upper bound of $h_{U1}$, so that an appropriate prime within $h_{U1}$ can not be found, a search starts over with a new randomly generated point $sp_1$. If the desired size of the RSA primes is larger, say, 1024 bits, then the user-specific data can have many more bits of data and still allow for the generation of RSA keys.

Utilizing the present invention, a potential attacker may possess the knowledge of the tighter bounds on the possible values of p and q than in the general scheme ANSI Standard X9.31-1998 which does not guarantee that the keys are unique and tied to user-specific data. However, if the tight bounds are known for p, then this knowledge combined with the knowledge of the public key N yields approximately the same range for the possible values of q that the knowledge of U's user-specific data would provide. In any case, the attacker has to deal with large primes coming from an interval of length at least $2^{309}$, and may be difficult, if not impossible, for one to take advantage of this knowledge.

While the present invention has been described with respect to a particular preferred embodiment, as will be appreciated by those of skill in the art, alternative methods may also be employed while still benefitting from the teachings of the present invention. For example, prime number q could be taken from anywhere in the interval $I_2$. This would still make the RSA public key N=pq unique for each user, since no two users could have the same p. No user will be able to claim that their keys were generated by somebody else since no other user-specific data could lead to the generation of this p.

Another possible alternative embodiment would be to map D into $I_2$ using some function other than the function used to map D into $I_1$. This would make it possible for one user to have a larger p but a smaller q than the corresponding primes that another user might generate. Alternatively, mapping functions other than linear mapping functions may be utilized, however, it is preferred that whatever mapping function is utilized that the images $h_U$ are disjoint.

The present invention has also been described with reference to the use of user specific information. User specific information could be a userID or, biometric information or a combination of the two. In this regard, the present invention provides a means to "brand" a key, prime or other cryptographic value so that its rightful user can be determined. Those skilled in the art will recognize that such branding is not limited to only users, but could be used to brand a key, prime or other cryptographic value with information specific to and associated with an entity where the entity is other than a human user (i.e. entity specific information). For example, the user specific information could be used to brand information with a company identifier (companyID), thus enabling one to show that the branded value belongs to a specific company. Whereas a biometric is associated with a specific user, an identifier could be associated with a user, group, organization, company, etc., and therefore the present invention is not limited to a method of branding based only on user specific information. Thus, as used herein the term user specific information may also refer to entity specific information. A human user is just an example of one type of entity.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of generating an RSA cryptographic value, the method comprising the following carried out by hardware or hardware and software:

obtaining user specific information about a user;

dividing a potential range of RSA prime values into at least two subintervals;

selecting a first user-dependent RSA prime from a range of RSA prime values in a first of the at least two subintervals corresponding to a user specific range of values based on the user specific information mapped onto the first subinterval; and deriving an RSA key using the first user-dependent RSA prime.

2. A method according to claim 1, further comprising the step of:

selecting a second user-dependent RSA prime from a range of RSA prime values in a second of the at least two subintervals, different from the first subinterval, corresponding to the user specific range of values based on the user specific information mapped onto the second subinterval.

3. A method according to claim 1, wherein the user specific range of values are mapped by linearly mapping the user specific range of values onto the first subinterval.

4. A method according to claim 2, wherein the user specific range of values are mapped onto the first subinterval and mapped onto the second subinterval utilizing the same mapping function.

5. A method according to claim 2, further comprising the step of generating a user-dependent RSA key value from the first and second user-dependent primes.

6. A method according to claim 1, wherein the RSA prime values comprise n bits and wherein the first subinterval comprises RSA prime values from the set $[\sqrt{2}(2^{n-1}), 2^{n-1}+$ $2^{n-3/2}$] and the second subinterval comprises RSA prime values from the set [$2^{n-1}+2^{n-3/2},2^n$].

7. A method according to claim 2, wherein the RSA prime values comprise n bits and wherein the difference between the first RSA prime and the second RSA prime is greater than $2^{n-2}$.

8. A method according to claim 3, wherein the first subinterval comprises an interval [a,b], wherein the user specific range comprises an interval [c,d] and wherein the linear mapping function comprises the function defined by, $$F(x) = ux + v, \text{ where } u = \frac{d-c}{b-a} \text{ and } v = \frac{bc-ad}{b-a}.$$

9. A method according to claim 1 further comprising the step of selecting a second RSA prime from the potential range of RSA prime values.

10. A method according to claim 1, wherein the user specific information is biometric information.

11. A method according to claim 1, wherein the user specific information is a globally unique user identification.

12. A method according to claim 1, wherein the step of selecting a first user-dependent RSA prime comprises the steps of:
  selecting a random point in the range of RSA prime values in the first subinterval corresponding to the mapped user specific range of values; and
  utilizing the random point as a starting point for a search for a prime number (p) in the range of RSA prime values in the first subinterval corresponding to the mapped user specific range of values.

13. A method according to claim 12, further comprising the steps of:
  determining if a candidate for p is considered outside the range of RSA prime values in the first subinterval corresponding to the mapped user specific range of values;
  selecting a new random point as a search starting point if a candidate for p is considered outside the range of RSA prime values in the first subinterval corresponding to the mapped user specific range of values; and
  restarting the search for p utilizing the new random point.

14. A system for generating an RSA cryptographic value, comprising:
  obtaining means for obtaining user specific information about a user;
  determining means for determining a user specific range of values based on the user specific information;
  dividing means for dividing a potential range of RSA prime values into at least two subintervals;
  mapping means for mapping the user specific range of values onto a first of the at least two subintervals;
  selecting means for selecting a first user-dependent RSA prime from the range of RSA prime values in the first of the at least two subintervals corresponding to the mapped user specific range of values; and
  deriving means for deriving an RSA key using the first user-dependent RSA prime.

15. A system according to claim 14, wherein the mapping means comprises first mapping means, the system further comprising:
  second mapping means for mapping the user specific range of values onto a second of the at least two subintervals, different from the first of the at least two subintervals;
  selection means for selecting a second user-dependent RSA prime from the range of RSA prime values in the second of the at least two subintervals corresponding to the mapped user specific range of values.

16. A system according to claim 15, wherein the first mapping means for mapping comprises linear mapping means for linearly mapping the user specific range of values onto a first of the at least two subintervals.

17. A system according to claim 16, wherein the first mapping means for mapping the user specific range of values onto a first of the at least two subintervals and the second mapping means for mapping the user specific range of values onto a second of the at least two subintervals, different from the first of the at least two subintervals utilize the same mapping function.

18. A system according to claim 15, wherein the deriving means for deriving an RSA key using the first user-dependent RSA prime further comprises generating means for generating a user-dependent RSA key value from the first and second user-dependent primes.

19. A system according to claim 14, wherein the RSA prime values comprise n bits and wherein the first subinterval comprises RSA prime values from the set [$\sqrt{2}(2^{n-1})$, $2^{n-1}+2^{n-3/2}$] and the second subinterval comprises RSA prime values from the set [$2^{n-1}+2^{n-3/2},2^n$].

20. A system according to claim 15, wherein the RSA prime values comprise n bits and wherein the difference between the First RSA prime and the second RSA prime is greater than $2^{n-2}$.

21. A system according to claim 16, wherein the first subinterval comprises an interval [a,b], wherein the user specific range comprises an interval [c,d] and wherein the linear mapping function comprises the function defined by, $$F(x) = ux + v, \text{ where } u = \frac{d-c}{b-a} \text{ and } v = \frac{bc-ad}{b-a}.$$

22. A system according to claim 14 further comprising selection means for selecting a second RSA prime from the potential range of RSA prime values.

23. A system according to claim 14, wherein the user specific information is biometric information.

24. A system according to claim 14, wherein the user specific information is a globally unique user identification.

25. A system according to claim 14, wherein the selecting means for selecting a first user-dependent RSA prime comprises:
  selection means for selecting a random point in the range of RSA prime values in the first of the at least two subintervals corresponding to the mapped user specific range of values;
  searching means for utilizing the random point as a starting point for a search for a prime number (p) in the range of RSA prime values in the first of the at least two subintervals corresponding to the mapped user specific range of values.

26. A system according to claim 25, further comprising:
  determining means for determining if a candidate for p is considered outside the range of RSA prime values in the first of the at least two subintervals corresponding to the mapped user specific range of values;
  selection means for selecting a new random point as a search starting point if a candidate for p is considered outside the range of RSA prime values in the first of the at least two subintervals corresponding to the mapped user specific range of values; and restarting means for restarting the search for p utilizing the new random point.

27. A computer program product for generating an RSA cryptographic value, comprising:
a computer readable storage medium having computer readable program code embodied in said medium, said computer readable program code means comprising:
first computer-readable program code that is configured to obtain user specific information about a user;
second computer-readable program code that is configured to determine a user specific range of values based on the user specific information;
third computer-readable program code that is configured to divide a potential range of RSA prime values into at least two subintervals;
fourth computer-readable program code that is configured to map the user specific range of values onto a first of the at least two subintervals; and
fifth computer-readable program code that is configured to select a first user-dependent RSA prime from the range of RSA prime values in the first of the at least two subintervals corresponding to the mapped user specific range of values; and
sixth computer-readable program code that is configured to derive an RSA key using the first user-dependent RSA prime.

28. A computer program product according to claim 27, further comprising:
seventh computer-readable program code that is configured to map the user specific range of values onto a second of the at least two subintervals, different from the first of the at least two subintervals; and
eighth computer-readable program code means that is configured to select a second user-dependent RSA prime from the range of RSA prime values in the second of the at least two subintervals corresponding to the mapped user specific range of values.

29. A computer program product according to claim 28, wherein the seventh computer-readable program code comprises ninth computer-readable program code that is configured to linearly map the user specific range of values onto a first of the at least two subintervals.

30. A computer program product according to claim 29, wherein the fourth computer-readable program code and the seventh computer-readable program code utilize the same mapping function.

31. A computer program product according to claim 28, wherein the sixth computer-readable program code further comprises ninth computer readable program code that is configured to generate a user-dependent RSA key value from the first and second user-dependent primes.

32. A computer program product according to claim 26, wherein the RSA prime values comprise n bits and wherein the first subinterval comprises RSA prime values from the set [√2(2$^{n-1}$), 2$^{n-1}$+2$^{n-3/2}$] and the second subinterval comprises RSA prime values from the set [2$^{n-1}$+2$^{n-3/2}$,2$^{n}$].

33. A computer program product according to claim 28, wherein the RSA prime values comprise n bits and wherein the difference between the first RSA prime and the second RSA prime is greater than 2$^{n-2}$.

34. A computer program product according to claim 29, wherein the first subinterval comprises an interval [a,b], wherein the user specific range comprises an interval [c,d] and wherein the linear mapping function comprises the function defined by, $$F(x) = ux + v, \text{ where } u = \frac{d-c}{b-a} \text{ and } v = \frac{bc-ad}{b-a}.$$

35. A computer program product according to claim 27 further comprising seventh computer-readable program code that is configured to select a second RSA prime from the potential range of RSA prime values.

36. A computer program product according to claim 27, wherein the user specific information is biometric information.

37. A computer program product according to claim 27, wherein the user specific information is a globally unique user identification.

38. A computer program product according to claim 27, wherein the fifth computer-readable program code comprises:
seventh computer-readable program code that is configured to select a random point in the range of RSA prime values in the first of the at least two subintervals corresponding to the mapped user specific range of values; and
eighth computer-readable program code that is configured to utilize the random point as a starting point for a search for a prime number (p) in the range of RSA prime values in the first of the at least two subintervals corresponding to the mapped user specific range of values.

39. A computer program product according to claim 38, further comprising:
ninth computer-readable program code that is configured to determine if a candidate for p is considered outside the range of RSA prime values in the first of the at least two subintervals corresponding to the mapped user specific range of values;
tenth computer-readable program code that is configured to select a new random point as a search starting point if a candidate for p is considered outside the range of RSA prime values in the first of the at least two subintervals corresponding to the mapped user specific range of values; and
eleventh computer-readable program code that is configured to restart the search for p utilizing the new random point.

40. A method of generating a cryptographic value corresponding to a source entity, the method comprising the following carried out by hardware or hardware and software:
obtaining entity specific information associated with the source entity;
selecting a cryptographic value from a range of cryptographic values based on the entity specific information, wherein the range of cryptographic values based on the entity specific information is disjoint with ranges of cryptographic values associated with entity specific information associated with entities other than the source entity; and
deriving a cryptographic key value based on the selected cryptographic value.

41. A method according to claim 40, wherein the entity specific information comprises biometric information associated with a user.

42. A method according to claim 40, wherein the entity specific information comprises a globally unique user identification associated with a user.

43. A method according to claim 40, wherein the entity specific information comprises a company identification.

44. A method according to claim 40, wherein the cryptographic value comprises an RSA key and wherein the step of selecting comprises selecting the RSA key from a portion of the range of potential RSA key values based on the entity specific information, wherein portion of the range of potential RSA key values is defined by mapping an entity specific range of values onto the range of potential key values and wherein the step of deriving a cryptographic key value based on the selected cryptographic value comprises providing the selected RSA key as the derived cryptographic key value.

45. A method according to claim 40, further comprising the step of authenticating the source entity of the cryptographic value by determining if the cryptographic value is within the range of cryptographic values based on the entity specific information associated with the source entity.

46. A system for generating a cryptographic value corresponding to a source entity, comprising:
obtaining means for obtaining entity specific information associated with the source entity;
selecting means for selecting a cryptographic value from a range of cryptographic values based on the entity specific information, wherein the range of cryptographic values based on the entity specific information is disjoint with ranges of cryptographic values associated with entity specific information associated with entities other than the source entity; and
deriving means for deriving a cryptographic key value based on the selected cryptographic value.

47. A system according to claim 46, wherein the entity specific information comprises biometric information associated with a user.

48. A system according to claim 46, wherein the entity specific information comprises a globally unique user identification associated with a user.

49. A system according to claim 46, wherein the entity specific information comprises a company identification.

50. A system according to claim 46, wherein the cryptographic value comprises an RSA key and wherein the selecting means for selecting comprises selection means for selecting the RSA key from a portion of the range of potential RSA key values based on the entity specific information, wherein portion of the range of potential RSA key values is defined by mapping an entity specific range of values onto the range of potential key values and wherein the deriving means for deriving a cryptographic key value based on the selected cryptographic value comprises providing means for providing the selected RSA key as the derived cryptographic key value.

51. A system according to claim 46, further comprising authentication means for authenticating the source entity of the cryptographic value by determining if the cryptographic value is within the range of cryptographic values based on the entity specific information associated with the source entity.

52. A computer program product for generating a cryptographic value corresponding to a source entity, comprising:
a computer readable storage medium having computer readable program code means embodied in said medium, said computer readable program code means comprising:
first computer readable program code that is configured to obtain entity specific information associated with the source entity;
second computer readable program code that is configured to select a cryptographic value from a range of cryptographic values based on the entity specific information, wherein the range of cryptographic values based on the entity specific information is disjoint with ranges of cryptographic values associated with entity specific information associated with entities other than the source entity; and
third computer readable program code that is configured to derive a cryptographic key value based on the selected cryptographic value.

53. A computer program product according to claim 52, wherein the entity specific information comprises biometric information associated with a user.

54. A computer program product according to claim 52, wherein the entity specific information comprises a globally unique user identification associated with a user.

55. A computer program product according to claim 52, wherein the entity specific information comprises a company identification.

56. A computer program product according to claim 52, wherein the cryptographic value comprises an RSA key and wherein the second computer readable program code comprises fourth computer readable program code that is configured to select the RSA key from a portion of the range of potential RSA key values based on the entity specific information, wherein portion of the range of potential RSA key values is defined by mapping an entity specific range of values onto the range of potential key values and wherein the third computer readable program code comprises fifth computer readable program code that is configured to provided the selected RSA key as the derived cryptographic key value.

57. A computer program product according to claim 52, further comprising fourth computer readable program code configured to authenticate source entity of the cryptographic value by determining if the cryptographic value is within the range of cryptographic values based on the entity specific information associated with the source entity.

* * * * *